Feb. 26, 1952     H. GRANDGIRARD     2,587,141
CUSHIONING DEVICE FOR HYDRAULIC CLUTCHES
Filed Jan. 26, 1946     2 SHEETS—SHEET 1
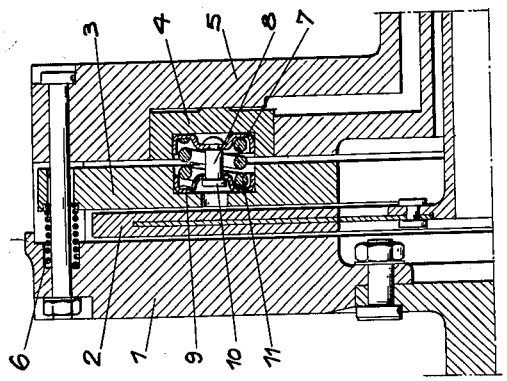
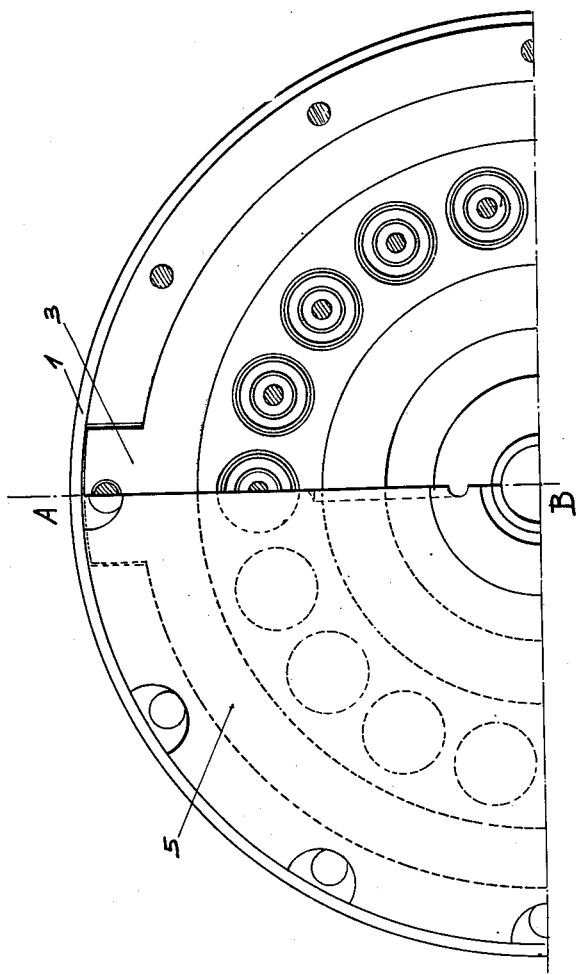
INVENTOR
HENRY GRANDGIRARD
BY
*Haseltine, Lake & Co*
ATTORNEYS Feb. 26, 1952   H. GRANDGIRARD   2,587,141
CUSHIONING DEVICE FOR HYDRAULIC CLUTCHES
Filed Jan. 26, 1946   2 SHEETS—SHEET 2
Fig.3.
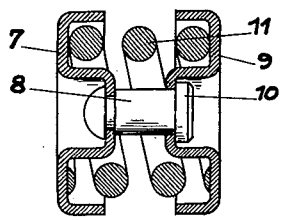
Fig.4.   Fig.5.
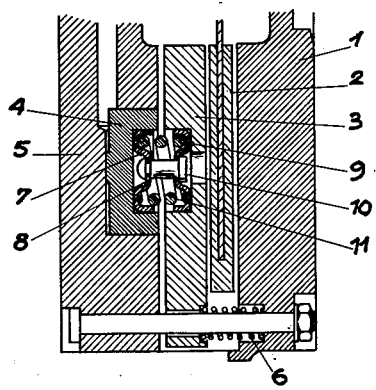   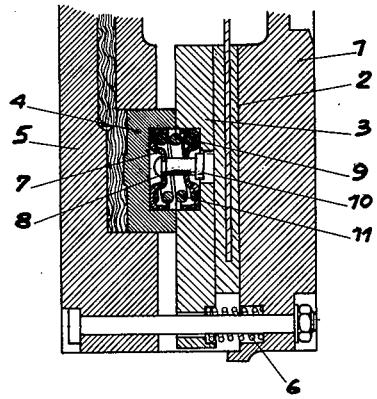
Fig.6.
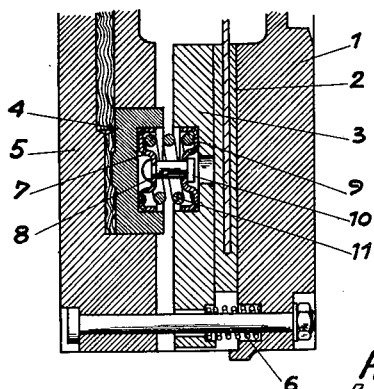
Inventor
HENRI GRANDGIRARD
By Haseltine, Lake & Co.
Attorneys Patented Feb. 26, 1952

2,587,141

UNITED STATES PATENT OFFICE 2,587,141

CUSHIONING DEVICE FOR HYDRAULIC CLUTCHES

Henri Grandgirard, Puteaux, France, assignor to Société des Brevets Kegresse, S. E. K., Paris, France, a corporation of France Application January 26, 1946, Serial No. 643,806
In France December 22, 1943

Section 1, Public Law 690, August 8, 1946
Patent expires December 22, 1963

1 Claim. (Cl. 192—85)

The present invention relates to hydraulically actuated clutches of the type in which the discs are hydraulically compressed by means of annular plates or pistons. In such clutches, an undesirable slipping is observed as soon as the flow of pressure fluid ceases. This phenomenon is due to the incompressibility of the actuating fluid, combined with the inevitable lack of fluid-tightness of the joints in the circulation system of the fluid and mainly between the rotating and fixed parts of the clutch. In these conditions, the pressure of the fluid drops immediately when the supply ceases.

This slipping is harmful in all clutches; it is in particular incompatible with the satisfactory operation of the change speed gears of automobile transmissions having two clutches which are hydraulically controlled and alternatively ensure the changing of the successive gears. In such transmissions, it is, in fact, indispensable for the clutch controlling the operative gear to continue to transmit the power of the engine after the flow of the pressure fluid has ceased in said clutch, at least during the time necessary for the engagement of the next gear and for the setting in operation of the other clutch; if it were otherwise, a "gap" would occur in the drive of the vehicle.

The present invention has for an object a clutch arrangement which enables the losses of fluid in one clutch to be temporarily compensated from the instant when the flow of the fluid ceases, and thereby to maintain a sufficient pressure behind the actuating piston of that clutch to permit the discs to remain compressed during the time necessary for the engagement of the other clutch corresponding to the adjacent gear.

According to the invention, resilient members are interposed between the piston and the pressure plate, said members serving during their extension from a compressed condition temporarily to compensate for leakage in the fluid system, thereby stabilizing at a minimum value the bearing pressure of the clutch plate. These resilient members serve to extend the period during which the clutch plates are in driving engagement.

The resilience of said members is preferably such that when they are extended, they correspond to the minimum bearing pressure necessary to produce the drive and, when they are compressed, they correspond to the maximum bearing pressure provided for between the clutch plates.

The accompanying drawings show, by way of example, one embodiment of the invention. In said drawings:

Figure 1 is a half elevation of the general arrangement of the improved clutch according to the invention (the cover and the piston being removed in the right-hand portion of this figure);

Figure 2 is a section on line A—B of Figure 1;

Figure 3 shows, on a larger scale, one of the resilient members provided according to the invention;

Figure 4 is a section similar to Figure 2, showing the positions of the annular piston and pressure plate with the clutch disengaged;

Figure 5 is a similar section showing the positions of the annular piston and pressure plate with the clutch fully engaged by the action of the actuating fluid; and Figure 6 is another similar section showing the position of the annular piston and pressure plate during extended engagement of the clutch when the flow of the actuating fluid ceases and its pressure is reduced by leakage.

Referring to the drawings, 1 designates the flywheel, which may constitute the fixed plate of the clutch, 2 the clutch disc, 3 the movable pressure plate, 4 the annular actuating piston, 5 the cover of the clutch carrying the ducts and distribution members (not shown) for the fluid, and 6 the retracting springs of the pressure plate.

These various elements and their operation are known. The improvements in this arrangement, according to the invention, consist in interposing between the plate 3 and the piston 4 a number of resilient members comprising, for example, pushers such as that illustrated in Figure 3, a sufficient number of which pushers being provided to produce the pressure necessary for the engagement of the clutch and being located in housings which are uniformly distributed over the opposed faces of the plate and piston.

Each resilient member comprises, in the embodiment shown, a spring 11, a cup 7, to which is secured a stem 8, and a second cup 9 movable on the stem in the direction of compression of the spring but which, in the opposite direction, abuts against a head 10 on the stem 8, thereby to keep the spring under a predetermined tension.

The strength and flexibility of the springs according to the invention are so calculated that firstly, when all the resilient members are free with the cups 9 abutting against the heads 10, their total force corresponds to the minimum pressure which has to be exerted on the disc 2 to keep the clutch engaged, and to transmit the maximum power without slipping; and, secondly they are completely compressed when the maximum pressure of the actuating fluid is exerted behind the piston 4, thereby enabling said piston to come into direct contact with the plate 3. In practice, the values of these two extreme pressures are in the ratio of 3 to 4 in the present embodiment.

The mechanism of this invention operates in the following manner, reference being made to Figures 4, 5 and 6:

During disengagement of the clutch, no pressure fluid is supplied behind the piston 4. The springs 6 push back the plate 3 and the piston 4, thereby releasing the disc 2, which moves away from the flywheel 1, as shown in Figure 4.

With total engagement of the clutch, as shown in Figure 5, the disc 2 is compressed by the action of the pressure fluid supplied behind the piston 4 and the latter, after having compressed the springs 11, comes directly into contact with the plate 3. The plate-piston unit thus moves towards the flywheel 1, and presses the clutch disc 2 thereagainst. At this phase of the operation, the action of the resilient members provided according to the invention is therefore eliminated.

If the supply of fluid ceases and leakages have allowed the escape of a part of the liquid, so that the pressure drops, though not to zero, the springs 11, in expanding, enable the piston 4 to move backwardly relatively to the plate 3, thereby compensating for the volume of liquid lost; the pressure exerted by the clutch disc 2 therefore still corresponds, during this period, to the force necessary for transmitting the power of the engine, since the strength and the number of the springs 11 have been chosen precisely for this purpose. This state of equilibrium, illustrated in Figure 6, remains prevalent until the instant when the cups 9 abut against the heads 10.

The time during which this stabilization of the pressure is effective depends, of course, on the extent of the leakage in the circulation system of the fluid, on the viscosity of the fluid, and also on the extent of travel which is permitted for the cup 9; in practice it is sufficient, however, in a change speed gear such as that above mentioned, to permit the filling of the second clutch.

While the drawings show only one embodiment of the invention, numerous constructional modifications can be made within the scope of the appended claim.

What I claim is:

In a hydraulically controlled clutch comprising a driving member controlled by an annular piston rotatable therewith and displaceable by fluid pressure, the fluid acting in an annular pressure chamber accommodating the piston, a plurality of resilient members interposed between the driving member and piston, each resilient member comprising a pair of cups, a coil spring compressed between said cups, and a stem coaxially arranged with respect to said cups and spring and fixed to one of said cups, said other cup being slidable on said stem, said stem being provided with an abutment arresting said slidable cup at a predetermined extension value of said spring, said annular piston having transverse extensions directed toward the driving member and coming into direct contact therewith when the springs are completely compressed.

HENRI GRANDGIRARD.

REFERENCES CITED

The following references are of record in the file of this patent:

UNITED STATES PATENTS

| Number | Name | Date |
|---|---|---|
| 786,294 | Joy | Apr. 4, 1905 |
| 1,442,092 | Parsons et al. | Jan. 16, 1923 |
| 1,648,864 | Pugh | Nov. 8, 1927 |
| 1,913,525 | Valentine et al. | June 13, 1933 |
| 2,123,867 | Criley | July 19, 1938 |
| 2,386,220 | Lawler et al. | Oct. 9, 1945 |